UNITED STATES PATENT OFFICE.

WILHELM HERZBERG AND OTTO HANSMANN, OF BERLIN, GERMANY, ASSIGNORS TO THE ACTIEN-GESELLSCHAFT FÜR ANILIN FABRIKATION, OF SAME PLACE.

BROWN DYE.

SPECIFICATION forming part of Letters Patent No. 657,064, dated August 28, 1900.

Application filed June 28, 1900. Serial No. 21,986. (Specimens.)

*To all whom it may concern:*

Be it known that we, WILHELM HERZBERG and OTTO HANSMANN, of Berlin, in the Kingdom of Prussia, German Empire, have invented new and useful Improvements in the Production of Brown Dye; and we do hereby declare that the following is a full, clear, and exact description of the invention, which will enable others skilled in the art to which it appertains to make and use the same.

It is well known that for certain dyeing purposes it is necessary that the dyestuffs used should dye very uniformly and resist at the same time milling, soaping, &c. As a rule the power to dye uniformly of coloring-matters depends upon a certain degree of solubility. On the other hand, increasing solubility in most cases is accompanied by a diminished fastness to milling and soaping. Hence it is of great technical importance to produce dyestuffs which possess both the valuable properties above referred to. Mordant-dyeing coloring-matters of an extraordinary fastness to milling are obtained by combining diazotized picramic acid with meta-diamins. (Compare German Patent No. 112,819 of March 4, 1898, granted to the Actien-Gesellschaft für Anilin Fabrikation.) In order to impart to them a greater power to dye uniformly, the next way would be to increase their solubility by the introduction of acid radicals. However, the coloring-matters produced, for instance, by combining the diazo compound of picramic acid with meta-diamin-sulfonic acids proved to be considerably less fast to milling. We have now made the unexpected discovery that by starting from chloro-meta-phenylenediamin $(Cl:NH_2:NH_2=1:2:4)$ a coloring-matter is obtained, the solubility and power to dye uniformly of which is superior to those of the dyestuffs of German Patent No. 112,819, while its fastness to milling, soaping, &c., remains unchanged. Most probably in this case the chlorin atom acts as a weakly acid group, preventing the salt of the dyestuff from being dissociated.

Our new dyestuff is extraordinarily fit for all purposes for which combined fastness and power to dye uniformly are required. It is the more valuable as chloro-meta-phenylenediamin, $(Cl:NH_2:NH_2=1:2:4,)$ is easily obtainable, and a product of but little cost.

To further illustrate our invention, we give the following directions: 22.4 kilos of sodium picramate are dissolved in water and twenty kilos of concentrated hydrochloric acid, (specific gravity equals 1.16.) The solution obtained is diazotized by means of 6.9 kilos of sodium nitrite. The diazo solution is allowed to run slowly into a solution of 14.5 kilos of chlorophenylenediamin $(Cl:NH_2:NH_2=1:2:4)$ and the mixture is well stirred during several hours. 5.3 kilos of sodium carbonate are then added thereto. The liquid is heated and the dyestuff is precipitated by means of common salt. The sodium salt of the dyestuff thus obtained is soluble in water with yellowish-red coloration, which on addition of sodium carbonate or caustic-soda lye turns slightly more yellowish. From this aqueous solution the dyestuff separates on addition of acetic acid in the form of a dark-red precipitate. It is hardly soluble in alcohol with yellowish-red coloration. It dissolves in concentrated sulfuric acid, forming a magenta-red solution, which on addition of ice-water turns yellowish and on continued dilution separates brownish-yellow flakes.

The dyestuff dyes chromium-mordanted wool fine brown shades of great intensity and of an extraordinary fastness to milling and to light.

Having now described our invention and in what manner the same is to be performed, what we claim as new is—

The brown dye produced by combining diazotized picramic acid with chloro-meta-phenylenediamin $(Cl:NH_2:NH_2=1:2:4:)$; the sodium salt of the dye being soluble in water with yellowish-red coloration which on addition of sodium carbonate or caustic-soda lye turns slightly more yellowish; the dye being precipitated from this aqueous solution by means of acetic acid in the form of a dark-red powder; the dye being hardly soluble in alcohol with yellowish-red coloration; easily soluble in concentrated sulfuric acid forming a magenta-red solution which on addition of ice-water turns yellowish, and on continued dilution separates brownish-yellow flakes; the dye producing on chromium-mordanted wool fine brown shades of great intensity and of an extraordinary fastness to milling and to light.

In witness whereof we have hereunto signed our names, this 14th day of June, 1900, in the presence of two subscribing witnesses.

WILHELM HERZBERG.
OTTO HANSMANN.

Witnesses:
HENRY HASPER,
WOLDEMAR HAUPT.